(12) United States Patent
Weller et al.

(10) Patent No.: US 7,986,493 B2
(45) Date of Patent: Jul. 26, 2011

(54) DISCRETE TRACK MAGNETIC MEDIA WITH DOMAIN WALL PINNING SITES

(75) Inventors: Dieter Weller, San Jose, CA (US); Timothy J. Klemmer, Pittsburgh, PA (US); Kim Y. Lee, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 904 days.

(21) Appl. No.: 11/946,535

(22) Filed: Nov. 28, 2007

(65) Prior Publication Data

US 2009/0135518 A1 May 28, 2009

(51) Int. Cl.
G11B 5/82 (2006.01)
(52) U.S. Cl. ....................................................... 360/135
(58) Field of Classification Search ............... 360/97.01, 360/135
See application file for complete search history.

(56) References Cited

U.S. PATENT DOCUMENTS

| | | | |
|---|---|---|---|
| 5,723,033 A | 3/1998 | Weiss | |
| 5,739,972 A | 4/1998 | Smith et al. | |
| 6,222,702 B1 | 4/2001 | Macken et al. | |
| 6,334,960 B1 | 1/2002 | Willson et al. | |
| 6,657,809 B2 | 12/2003 | Ottesen et al. | |
| 6,703,099 B2 | 3/2004 | Belser | |
| 6,757,126 B1 * | 6/2004 | Kuroda et al. | 360/77.02 |
| 6,834,005 B1 | 12/2004 | Parkin | |
| 6,898,132 B2 | 5/2005 | Parkin | |
| 6,955,926 B2 | 10/2005 | Chen et al. | |
| 6,970,379 B2 | 11/2005 | Parkin | |
| 7,019,924 B2 | 3/2006 | McNeil et al. | |
| 7,034,374 B2 | 4/2006 | Drewes | |
| 7,108,797 B2 | 9/2006 | Chen et al. | |
| 7,161,753 B2 * | 1/2007 | Wachenschwanz et al. | 360/48 |
| 2002/0012295 A1 * | 1/2002 | Asano et al. | 369/44.26 |
| 2002/0131203 A1 * | 9/2002 | Litvinov et al. | 360/125 |
| 2002/0186506 A1 * | 12/2002 | Sato et al. | 360/135 |
| 2005/0271819 A1 | 12/2005 | Wago et al. | |
| 2006/0120132 A1 | 6/2006 | Parkin | |
| 2006/0121318 A1 | 6/2006 | Gage et al. | |
| 2007/0262301 A1 | 11/2007 | Cowburn et al. | |
| 2007/0278603 A1 | 12/2007 | Ochiai et al. | |

(Continued)

OTHER PUBLICATIONS

S. J. Graves, H. Mursoka, Y. Sugita and Y. Nakamura, "Domain Wall Pinning in Perpendicular recording media", Digests of INTERMAG 99, 1999 IEEE International Magnetics Conferences, May 18-21, 1999, Korea.

(Continued)

Primary Examiner — Jefferson Evans
(74) Attorney, Agent, or Firm — Alan G. Rego; Westman, Champlin & Kelly, P.A.

(57) ABSTRACT

A magnetic recording medium with domain wall pinning sites including a substrate, a soft magnetic underlayer, and a magnetic recording layer overlying the soft magnetic underlayer. In one embodiment the magnetic recording layer has at least two grooves providing a track having first and second sidewalls formed by the grooves. The sidewalls provide a plurality of pinning sites formed between the sidewalls for pinning magnetic domain walls in the track. At least one of the pinning sites includes a first indentation in the first sidewall and a paired second indentation in the second sidewall. In one embodiment data can be stored within the magnetic recording layer by positioning a write head adjacent the track and inducing at least two magnetic domains defining a domain wall. The domain wall migrates to one of the pinning sites in the track.

20 Claims, 9 Drawing Sheets

U.S. PATENT DOCUMENTS

2008/0278998 A1* 11/2008 Cowburn et al. .............. 365/171
2009/0040883 A1* 2/2009 Kim et al. .................. 369/13.41
2009/0103401 A1* 4/2009 Murakami ................. 369/13.24
2009/0109739 A1* 4/2009 Ranjan et al. ................. 365/171
2010/0067141 A1* 3/2010 Ishibashi et al. ................ 360/75

OTHER PUBLICATIONS

Dieter Suess, Josef Fidler, Karina Porath, Thomas Schrefl, and Dieter Weller; "Micromagnetic Study of Pinning Behavior in Percolated Media", Journal of Applied Physics 99, (08G905) 2006 American Institute of Physics.

B. D. Terris and T. Thomson; "Nanofabricated and Self-Assembled Magnetic Structures as Data Storage Media", 2005 J. Phys. D: Appl. Phys. 38, R199-R222.

Stephen Y. Chou, Peter R. Krauss and Preston J. Renstrom; "Nanoimprint lithography", J. Vac. Sci. Techno. B 154(6), Microelectronics and Nanometer Structures, 1996 American Vacuum Society, Nov./Dec. 1996, pp. 4129-4133.

Douglas J. Resnick, S. V. Sreenivasan and C. Grant Willson; "Step and Flash Imprint Lithography", Materials Today, Feb. 2004; pp. 34-42.

Dieter Weller; " Magnetic Recording Media Trends: Options, Issues and Potential Solutions", Seagate Recording Media Operations, Oct. 25, 2006, MINT Center, Tuscaloosa, AL.

* cited by examiner

DISCRETE TRACK MAGNETIC MEDIA WITH DOMAIN WALL PINNING SITES

BACKGROUND

Given the general desire to store ever-increasing amounts of digital information, designers and manufacturers of magnetic storage devices are continually striving to increase the bit density of magnetic storage media. In a magnetic recording disk this means increasing the areal density, i.e., both the number of tracks on a disk and the linear density of bits along a given track. New materials, as well as new recording methods, have led to higher areal densities.

For example, perpendicular magnetic recording systems have been developed for use in computer hard disk drives. A typical perpendicular recording head includes a trailing write pole, a leading return or opposing pole magnetically coupled to the write pole, and an electrically conductive magnetizing coil surrounding the yoke of the write pole. Perpendicular recording media typically include a hard magnetic recording layer and a soft magnetic underlayer which provide a flux path from the trailing write pole to the leading opposing pole of the writer.

To write to the magnetic recording media, the recording head is separated from the magnetic recording media by a distance known as the flying height. The magnetic recording media is moved past the recording head so that the recording head follows the tracks of the magnetic recording media, with the magnetic recording media first passing under the opposing pole and then passing under the write pole. Current is passed through the coil to create magnetic flux within the write pole. The magnetic flux passes from the write pole tip, through the hard magnetic recording track, into the soft underlayer, and across to the opposing pole. Because the magnetic flux magnetizes the magnetic recording layer in a vertical orientation, a much higher linear density can be achieved compared with longitudinal magnetic recording systems.

Areal densities have also been increased greatly by decreasing the number of magnetic grains in one data bit and by simultaneously decreasing the size of the magnetic grains. As the grains per bit and the overall size of the bits decrease, however, media noise and lower performance characteristics can arise due to exchange coupling among the grains. In addition, the thermal stability, and thus reliability, of the magnetic recording material is lowered as the grain volume is reduced below a minimum threshold where the ratio of magnetic energy to thermal energy for a given material reaches a superparamagnetic limit.

Among the currently proposed solutions to issues such as these are heat-assisted magnetic recording (HAMR) and bit-patterned media (BPM). In BPM, the magnetic recording surface is patterned to provide a number of discrete, single-domain magnetic islands (usually one island per bit) separated from each other to decrease exchange coupling between data bits. During a writing operation, a write head must be precisely positioned over a desired bit/island to magnetize the bit. As such, the writing process must be carefully synchronized with the data bits passing by the head as the disk rotates within the drive to facilitate accurate recording and eventual readback of data. Given the small size of the bits and the high speeds of rotating disk systems, accurately positioning the head over a desired bit can be difficult.

Heat-assisted magnetic recording, or HAMR, compensates for smaller grain volumes by using magnetic recording media having a very high magnetic anisotropy. The magnetic recording medium is heated during the write process in order to lower medium's coercivity sufficiently for a write head's magnetic field to magnetize the medium. Adaptation of the write head for heating and heat dissipation in the magnetic recording medium complicate the recording process. In addition, to provide magnetic and thermal decoupling for very small grain sizes (e.g., 3-5 nanometers), the high anisotropy magnetic grains require atomically thin and sharp grain boundaries. Such features can be difficult to achieve at the high temperatures required for processing high anisotropy materials.

SUMMARY

A magnetic recording medium having domain wall pinning sites can include a substrate, a soft magnetic underlayer overlying the substrate, and a magnetic recording layer overlying the soft magnetic underlayer. In one embodiment the magnetic recording layer has at least two grooves providing a track having first and second sidewalls formed by the grooves. The sidewalls provide a plurality of pinning sites formed between the sidewalls for pinning magnetic domain walls in the track. At least one of the pinning sites includes a first indentation in the first sidewall and a paired second indentation in the second sidewall. These and various other features and advantages will be apparent from a reading of the following detailed description.

DETAILED DESCRIPTION OF THE PREFERRED EMBODIMENTS

The following detailed description should be read with reference to the drawings, in which like elements in different drawings are numbered identically. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims.

Figure 1:
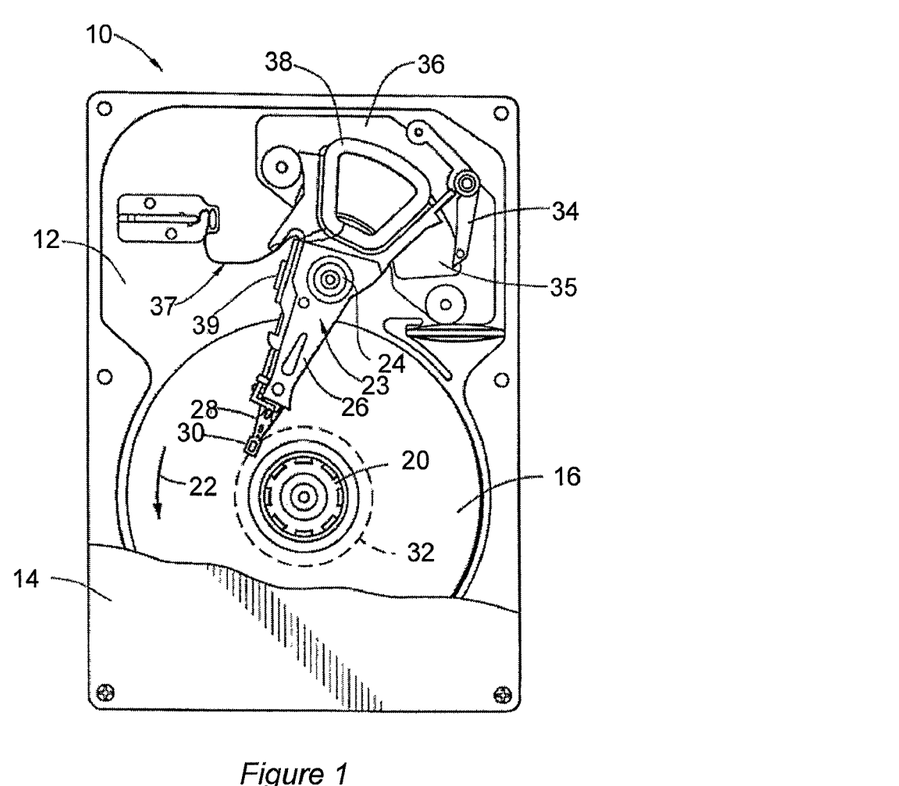
FIG. 1 illustrates a top plan view of a magnetic storage device according to one aspect of the present invention.

FIG. 1 is a top plan view of a magnetic storage device 10, which takes the form of a hard disk drive including a perpendicular magnetic recording system according to one embodiment of the present invention. The disk drive includes various components mounted to a base 12. A top cover 14 (shown in partial cutaway fashion) cooperates with the base 12 to form an internal, sealed environment for the disk drive.

According to the depicted embodiment, the magnetic storage device 10 includes magnetic recording media which take the form of a plurality of axially-aligned, magnetic recording disks 16 mounted to a spindle motor (shown generally at 20) for rotating at a speed in rotational direction 22. Although not visible in FIG. 1, the magnetic recording disks preferably comprise a perpendicular magnetic recording material for increased bit density. An actuator 23, which rotates about a bearing shaft assembly 24 positioned adjacent the disks 16, is used to write and read user data to and from data tracks (not designated) on the disks 16.

The actuator 23 includes a plurality of rigid actuator arms 26. Flexible suspension assemblies 28 are attached to the distal end of the actuator arms 26 to support a corresponding array of transducers 30 (e.g., read and/or write heads) with one transducer adjacent each disk surface. Each transducer 30 is configured to perpendicularly record magnetic data within the magnetic recording disks 16. For example, the transducers 30 may have a configuration including a trailing write pole and an opposing pole, as previously discussed. The transducers 30 additionally include a slider assembly (not separately designated) designed to fly in close proximity to the corresponding surface of the associated disk 16. Upon deactivating the disk drive 10, the transducers 30 come to rest on landing zones 32 and a magnetic latch 34 secures the actuator 23.

A voice coil motor (VCM) 36 is used to move the actuator 23 and includes an actuator coil 38 and permanent magnet 35. Application of current to the coil 38 induces rotation of the actuator 23 about the pivot assembly 24. A flex circuit assembly 37 provides electrical communication paths between the actuator 23 and a disk drive printed circuit board assembly (PCBA) mounted to the underside of the base 12. The flex circuit assembly 37 includes a preamplifier/driver circuit 39 which applies currents to the transducers 30 to read and write data.

Figure 2:
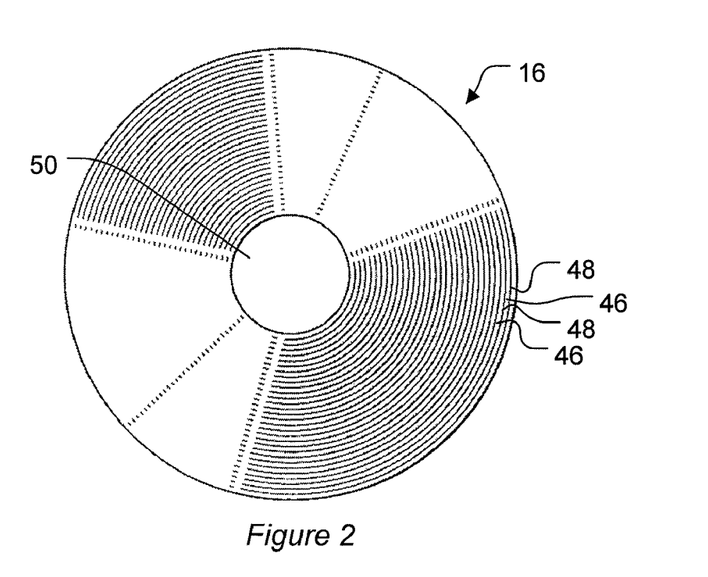
FIG. 2 illustrates a top view of a magnetic recording disk according to one aspect of the present invention.
Figure 3:
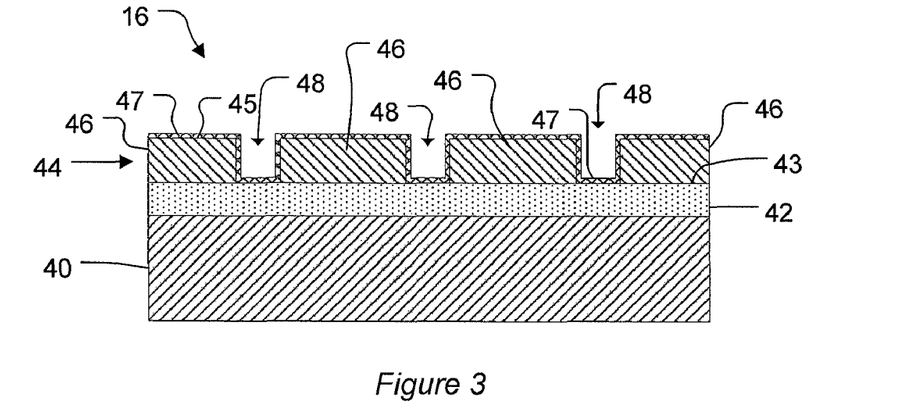
FIG. 3 illustrates a partial side sectional view of the magnetic recording disk according to one aspect of the present invention.
Figure 4:
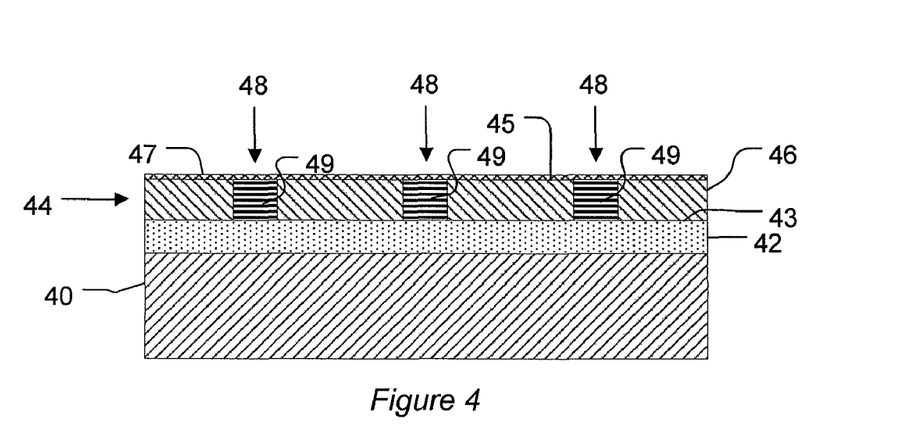
FIG. 4 illustrates a partial side sectional view of the magnetic recording disk according to one aspect of the present invention.
Figure 5:
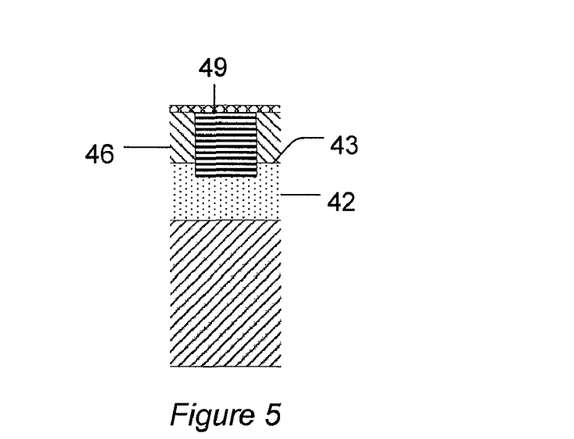
FIG. 5 illustrates a partial side sectional view of the magnetic recording disk according to one aspect of the present invention.

FIG. 2 is a top view and FIG. 3-5 are partial side sectional views of the magnetic recording disk 16 having various features according to different embodiments of the present invention. For purposes of illustration, the components of the magnetic recording disk 16 shown are not drawn to scale. Referring to FIG. 3, the magnetic recording disk 16 has a composition suitable for perpendicular magnetic recording. The disk 16 generally includes a substrate 40 made of a suitable material such as, for example, a suitable glass, ceramic, polymer, or composite of these materials, or a non-magnetic metal or alloy such as aluminum or NiP plated AlMg. A soft magnetic underlayer 42 (SUL) overlies the substrate 40, and includes a surface 43 over which lies a magnetic recording layer 44 with a surface 45.

The magnetic recording disk 16 includes a plurality of data tracks as previously mentioned for storing data. Referring to FIG. 3, in some embodiments, one or more of the tracks 46 are discretely formed in the magnetic recording layer 44. A track 46 is defined by at least two grooves 48 in the surface 45 of the magnetic recording layer 44. In one embodiment, the grooves 48 can be formed in the magnetic recording layer 44 with nanoimprinting techniques as will be discussed in detail herein after. The embodiment depicted in FIGS. 2 and 3 illustrates a plurality of tracks 46, each provided between two adjacent grooves 48. In the embodiment shown, the tracks 46 and grooves 48 extend circumferentially around a center 50 of the magnetic recording disk.

Although not shown in FIGS. 3-5 for purposes of clarity, additional intermediate layers of the perpendicular magnetic recording medium may be deposited between the substrate 40, the soft magnetic underlayer 42, and/or the magnetic recording layer 44 such as, for example, adhesion layers, spacer layers, and/or seed layers. Those skilled in the art will appreciate that other intermediate layers and various configurations of intermediate layers are possible. According to some embodiments, a thin protective layer 47, such as a layer of diamond-like carbon, overlies the surface 45 of the magnetic recording layer 44. In some embodiments, the protective layer 47 may also be deposited within the grooves 48 as shown in FIG. 3.

Referring again to FIG. 3, it can be seen that in one embodiment, the grooves 48 extend through the magnetic recording layer 44 to provide an absence of magnetic material between tracks 46. The lack of magnetic material can further magnetically and thermally isolate the track 46 from adjacent tracks as will be appreciated. In the embodiment shown, the grooves 48 extend completely through the magnetic recording layer 44 to the surface 43 of the SUL 42 without extending into the SUL 42 itself. Referring to FIG. 4, in some embodiments, a non-magnetic filler 49 is deposited within the grooves 48. For example, in one embodiment, the filler 49 comprises $Al_2O_3$, although it will be appreciated that a wide variety of suitable fillers can be used.

Alternate embodiments of the invention can include grooves 48 of different depths. In some situations, it may be desirable to extend the grooves 48 completely through the magnetic recording layer 44 and into the top of the SUL 42. For example, FIG. 5 depicts such a configuration. In some embodiments, the grooves 48 extend into the SUL 42 as far as 10% of the thickness of the SUL 42. For example, in embodiments where the SUL 42 is about 200 nanometers thick, the grooves 48 may extend about 20 nanometers into the top of the SUL 42. Although one embodiment has been discussed, it will be appreciated that other depths and/or percentages are also possible. For example, the grooves 48 may extend into the SUL 42 greater than 10%, or may not even extend completely through the magnetic recording layer 44.

According to some embodiments of the invention the magnetic recording layer 44 comprises a hard magnetic material suitable for perpendicular recording. The magnetic recording layer 44 can comprise, for example, Co alloys containing for example one or more of Pt, Cr, Fe, Ni or B. In addition, the magnetic recording layer 44 may comprise a material with a relatively high uniaxial anisotropy such as FePt or $SmCO_5$. In some embodiments, the SUL 42 can comprise FeCoB, CoCrZr, CoTaZr, FeCoZrTa, and/or NiFe, among other suitable soft magnetic materials. The SUL 42 may comprise multiple layers forming a synthetic antiferromagnet, for example, in a trilayer structure such as FeCoB/Ru/FeCoB. Those skilled in the art will appreciate that multiple configurations and materials are available for the SUL and the magnetic recording material, and that the invention is not meant to be limited to the embodiments described herein.

Although not shown in the figures, the magnetic recording layer 44 comprises a substantially continuous and exchange-coupled film according to some embodiments. Using a continuous film advantageously avoids the need for granulation, thus allowing for an easier and simpler fabrication process than that used for granulated films. Embodiments of the invention are not limited to use of a continuous film, however. The use of granular films is contemplated, such as when the complexities of the granulation process are of less concern.

The magnetic recording layer 44 may have any desired thickness, for example, about 5 nanometers to about 50 nanometers in some embodiments. In one embodiment the magnetic recording layer 44 has a thickness of about 5 nanometers to about 15 nanometers or, alternatively, about 5 nanometers to about 10 nanometers. The tracks 46 can also have any suitable width, which can then varied as will be discussed in more detail hereinafter. As just one example, in some embodiments at least one track can have a width of about 50 nanometers. The SUL 42 can have varying thicknesses, for example, in some embodiments the thickness of the SUL 42 may range from about 10 nanometers to about 200 nanometers. For those SUL layers including a trilayer structure, for example including a ruthenium layer as previously discussed, the thickness of the ruthenium layer may range from 0.5 nanometers to about 2 nanometers.

Figure 6:
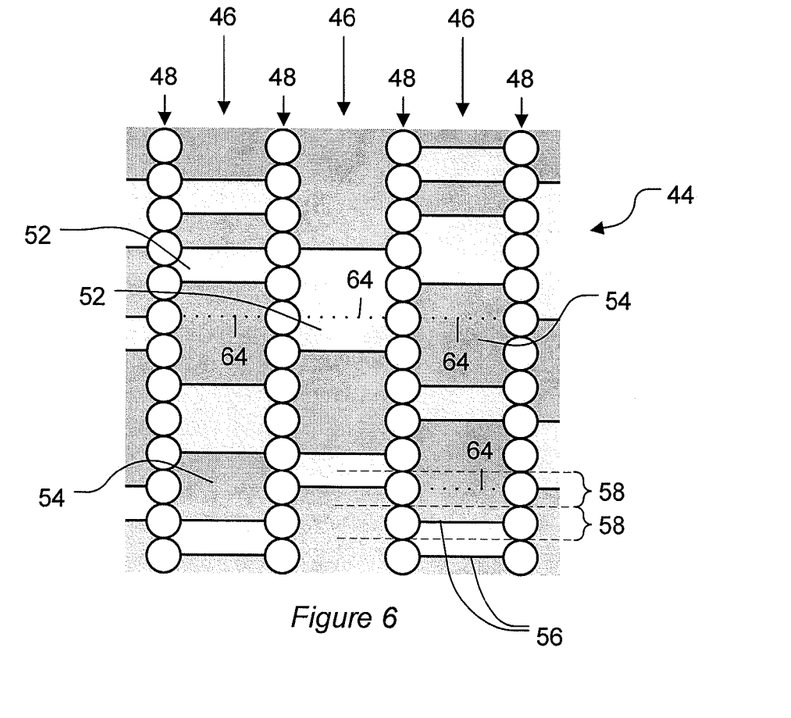
FIG. 6 illustrates a schematic of a portion of a magnetic recording layer having grooves and tracks according to one aspect of the present invention.

FIG. 6 is an enlarged schematic of a portion of the magnetic recording layer 44 illustrating the grooves 48 forming the tracks 46 according to one embodiment. As shown in FIG. 4, each track 46 is defined between two adjacent grooves 48. Data is magnetically stored within the tracks 46, which can include a number of sectors (not shown) for user data and servo information. It will be appreciated that the tracks, grooves and other features in FIG. 6 are not drawn to scale, but are illustrated so as to be more easily discerned.

According to one recording scheme for continuous media, data is recorded by creating a series of perpendicular magnetic domains within the tracks 46 with a recording head. For example, a first group of domains 52 have a first magnetization direction and a second group of domains 54 have a second, different, magnetization direction. With respect to FIG. 4, which illustrates the perpendicular recording material, for example, the first magnetization direction can point out of the magnetic recording layer surface 45 away from the disk substrate 40, while the second magnetization direction can point into the surface 45 towards the disk substrate 40. A domain wall 56 comprises an area of magnetic transition between the domains of different magnetizations.

In some embodiments, the magnetic domains are written into the tracks such that transitions or domain walls between domains are located within a bit cell 58 in the track, illustrated in FIG. 6 by dashed lines. As the read head passes over the track, a binary "one" is registered, for example, when the read head senses a domain wall 56 within the bit cell 58. Alternately, when the read head does not sense a domain wall 56 within the bit cell 58, a binary "zero" is registered, for example.

Figure 7:
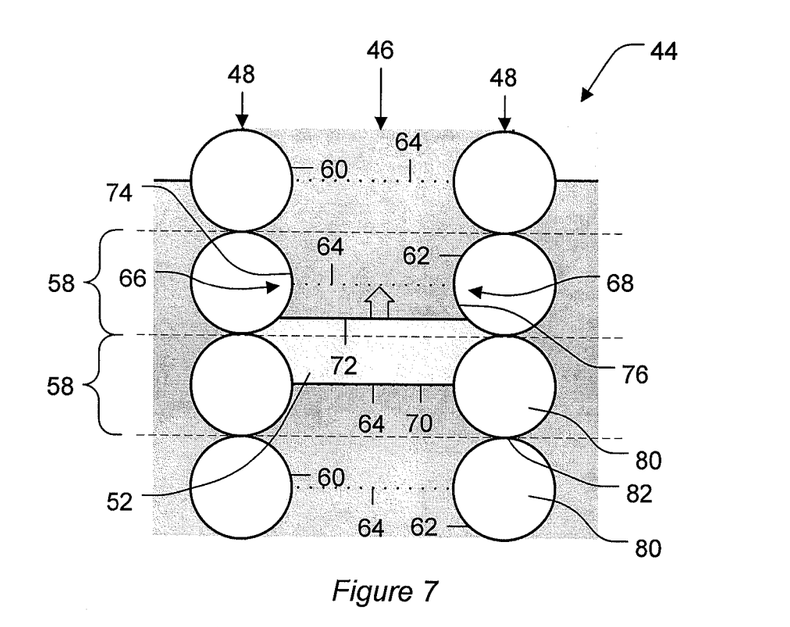
FIG. 7 illustrates an enlarged schematic of one track of FIG. 6 according to one aspect of the present invention.

FIG. 7 is an enlarged schematic of one track 46 of FIG. 6 defined in the magnetic recording layer 44 by two grooves 48 according to one embodiment of the present invention. The inner boundaries of the two grooves 48 form a first sidewall 60 and a second sidewall 62 of the interposed data track 46.

The groove boundaries, i.e., sidewalls 60, 62 of the data track 46 are shaped to facilitate data recording within the track's bit cells. For example, the data track 46 in FIG. 7 includes a plurality of pinning sites 64 formed between the sidewalls 60, 62. In one embodiment, after a write head creates a magnetic domain (e.g., the domain 52 with the first magnetic direction) within the track 46, the domain walls 70, 72 of the domain migrate to the nearest pinning sites 64 (represented by dotted lines) and are held there. Thus, the pinning sites 64 act to stabilize the magnetic domains within a continuous magnetic recording layer in some embodiments, although pinning sites are in some embodiments provided in granular magnetic recording layers.

To create such an effect, the geometry of the track's sidewalls 60, 62 is adjusted to take advantage of the tendency of a domain wall within the track 46 to migrate to a position that minimizes the total energy of the domain wall. In a perpendicular media, adjacent domains form a 180° domain wall. The energy of such a domain wall is estimated at $\gamma=4(AK)^{0.5}$ where A is the exchange constant and K is the uniaxial anisotropy of the material. The total energy of the domain wall is γwt, where wt is the area of the wall given by the width, w, of the track and the thickness, t, of the film. Thus, the domain wall moves to a position that minimizes the area of the domain wall in order to decrease the wall's overall energy. By varying the width of the track, pinning sites 64 can be created in the track.

With respect to FIG. 7, the sidewalls 60, 62 are shaped to create the plurality of pinning sites 64, which each comprise a narrowed portion of the track 46. Thus, in the embodiment depicted, each pinning site 64 provides a local energy minimum that attracts nearby domain walls due to the reduced sectional area of the track 46. For example, domain wall 72 is depicted with an arrow as migrating from a position with a larger track width to the nearest pinning site 64. Accordingly, data can be recorded within the track 46 without exactly synchronizing the write head with the bit cells 58. When a domain wall 56 is somewhat misaligned, it migrates to the nearest pinning site 64, thus providing a predictable placement to increase a read head's ability to accurately sense the recorded data.

In some embodiments, the pinning sites 64 comprise a first indentation 66 in the first sidewall 60 and a corresponding or paired second indentation 68 in the second sidewall 62 of the track. The first and second indentations 66, 68 cooperate together to provide a narrowed portion of the track 46, and may take a variety of shapes. For example, as shown in FIG. 7, the first and second indentations 66, 68 comprise concave portions 74, 76 in the first side wall 60 and the second sidewall 62, respectively. In other embodiments the first and second indentations are formed, for example, as angular or square notches. In addition, some first and second indentations gradually narrow with respect to the immediately adjacent portions of the sidewalls to create a local track width minimum so as to more precisely locate a domain wall. For example, the concave portions 74, 76 in FIG. 7 provide a single minimum track width at their midpoints.

As shown in FIGS. 6 and 7, adjacent grooves 48 define a series of pinning sites 64 positioned along the length of each track 46 between the grooves 48. As shown, the pinning sites are positioned at predetermined intervals along each track 46. For example, the grooves 48 create repeating, substantially equally spaced pairs of first and second indentations 66, 68, and thus pinning sites 64 along each track 46. In some embodiments, each pair of first and second indentations 66, 68 are aligned so that the corresponding pinning site 64 are radially aligned with respect to the center of a magnetic recording disk.

In some embodiments, each bit cell 58 comprises at least one pinning site 64. As shown in FIGS. 6 and 7, consecutive bit cells 58 comprise consecutive pinning sites 64, and correspond to the repeating pattern of paired first and second indentations 66, 68 created by the grooves in the sidewalls of the track. By decreasing the spacing between consecutive pinning sites 64, the linear density of bit cells can be advantageously increased.

Linear density can also be increased in some embodiments in which the magnetic recording layer 44 comprises a magnetic material with a relatively high uniaxial anisotropy. For example, the width of a 180° domain wall is $\delta=\pi(A/K)^{0.5}$. By using a material with a greater anisotropy (K), the width of a domain wall (extending in the downtrack direction) is decreased, thus allowing a higher linear bit density. For example, domain walls in FePt have a $\delta \approx 4$ nm and domain walls in $SmCO_5$ have a $\delta \approx 2$ nm. In addition, to provide strong pinning sites for pinning domain walls, the indentations in the sidewalls of the track according to some embodiments are sized similarly to the dimensions of domain walls created in the magnetic material. Thus, in one embodiment, indentations with a width of approximately 5 nanometers are provided for pinning domain walls in FePt and $SmCO_5$.

To provide a repeating series of paired indentations and pinning sites, the grooves 48 can be formed in the magnetic recording layer 44 as a series of holes 80. The profile of the holes 80 in one groove 48 forms repeating second indentations 68 in the second sidewall of one track and repeating first indentations 66 in the first sidewall of an adjacent track. In some embodiments, the holes in at least one groove 48 do not connect with one another, forming a groove 48 with discontinuities 82 as in FIGS. 6 and 7. According to other embodiments, the holes 80 in at least one groove 48 connect together, forming a continuous groove.

The shape of the holes 80 can be modified as desired to provide first and second indentations of varying suitable shapes and dimensions such as already discussed. For example, in one embodiment, the holes 80 have a diameter (i.e., width in the downtrack direction) that is similar in size to the thickness of domain walls for a given material, as previously discussed herein. For example, the diameter of the holes 80 may be approximately 5 nanometers in embodiments with a magnetic recording layer including FePt or $SmCO_5$. In another embodiment, the holes 80 are stretched to provide longer bit cells, for example, about 10 to 15 nanometers long. In the embodiment shown in FIGS. 6 and 7, the holes 80 of one groove 48 are aligned with holes from adjacent grooves along radii of a magnetic recording disk, although this is not required. For example, the holes from adjacent grooves may be staggered to some degree with respect to the radii of the disk.

Figure 8:
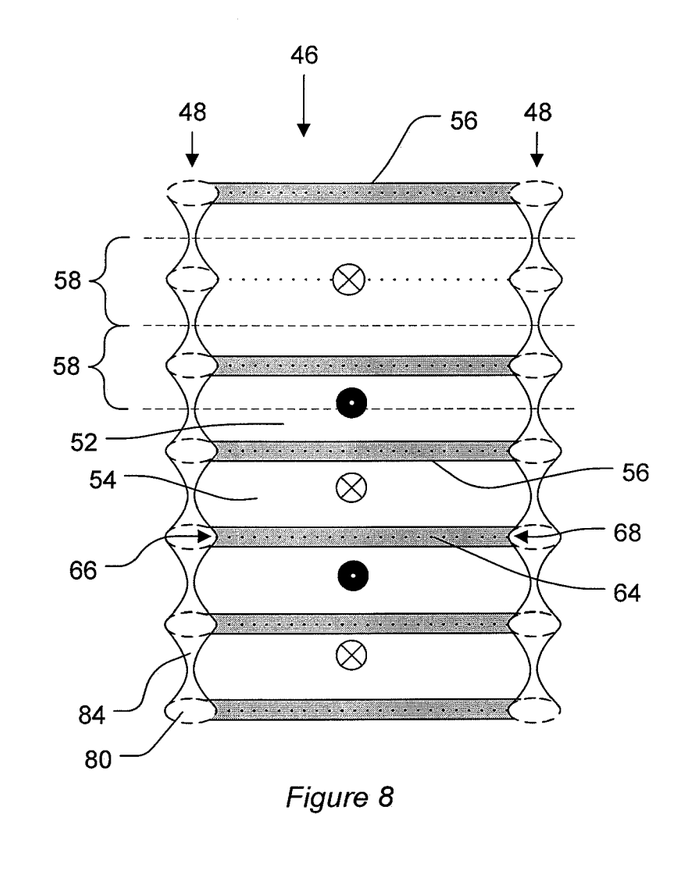
FIG. 8 illustrates a schematic of a portion of a magnetic recording layer having grooves and tracks according to one aspect of the present invention.
Figure 9:
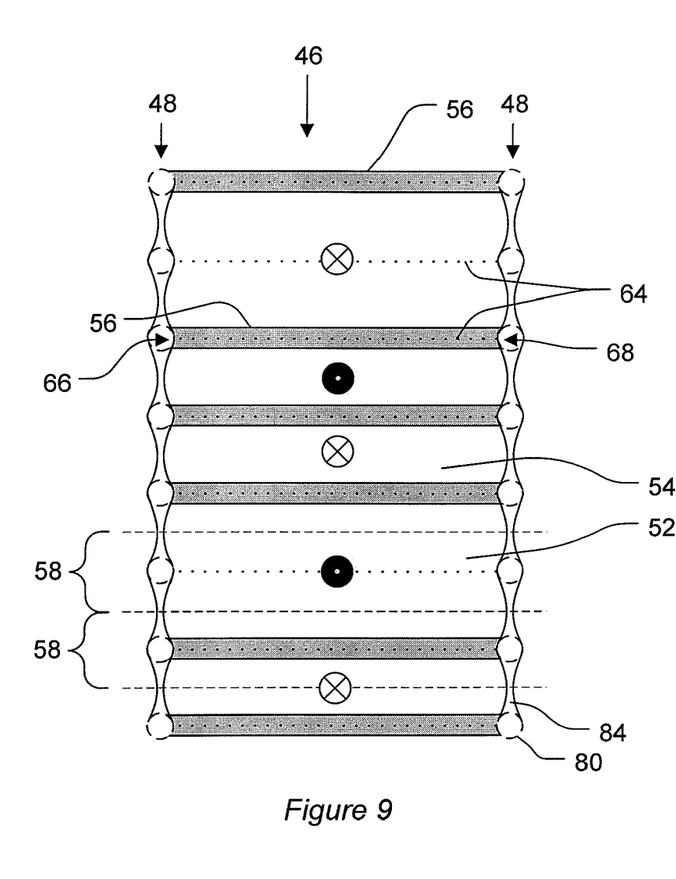
FIG. 9 illustrates a schematic of a portion of a magnetic recording layer having grooves and tracks according to one aspect of the present invention.

FIGS. 8 and 9 illustrate two possible embodiments in which the holes 80 (and thus the paired indentations 66, 68 and pinning sites 64) are separated to a degree. In these embodiments, the holes 80 (illustrated with dashed lines) are connected together with connecting portions 84, as will be described in further detail herein. Thus, the holes 80 and connecting portions 84 provide continuous grooves 48 along each side of the data track 46. In these embodiments, the holes 80 provide the repeating, paired indentations 66, 68 in each side of the track 46, although any method of forming the indentations may be used.

Such configurations can be useful, for example, to provide longer bit cells 58 with spaced pinning sites 64. As shown in FIGS. 8 and 9, the domain walls 56 can form at the pinning sites 64, which locate the transitions between adjacent magnetic domains. As illustrated, the first group of domains 52 have magnetic fields pointing out from the FIGS. 8 and 9 and the second group of domains 54 have magnetic fields pointing into FIGS. 8 and 9. The indentations 66, 68 (e.g., holes 80) can be formed at regular intervals along the downtrack direction with any spacing desired. For example, in one embodiment, the pinning sites 64 are formed every about 10 to 15 nanometers along the track 46, while in another embodiment, the pinning sites 64 can be spaced about 12 nanometers apart. In other embodiments, the pinning sites 64 may be spaced closer or further apart than 10 to 15 nanometers.

Domain walls created in the area of a connecting portion 84 will tend to migrate to the nearest pair of indentations 66, 68 (i.e., pinning site), and data writing does not need to be exactly synchronized with precise locations along the track 46. Referring to FIG. 8, in some embodiments, the holes 80 can be stretched in a crosstrack direction and merged with the connecting portions 84. As is shown, the connecting portions 84 can be contoured to create a local track width minimum at the location of the holes 80. Stretching the holes 80 in a crosstrack direction allows the connecting portions 84 to contour away from the edge of the holes to a greater degree, so as to provide a greater contrast in track width between the connecting portion 84 and the indentations 66, 68 formed by the holes 80.

A method of storing data in a magnetic recording medium includes providing a magnetic storage device, such as the hard disk drive 10 shown in FIG. 1, with a magnetic recording medium such as a magnetic disk. The magnetic recording disk includes in one embodiment at least a substrate with an overlying soft magnetic underlayer and an overlying magnetic recording layer comprising a perpendicular magnetic recording material. The magnetic recording layer comprises at least two grooves providing a track with first and second sidewalls formed by the at least two grooves. The first and second sidewalls provide a plurality of pinning sites formed between the sidewalls. The method further includes providing a transducer such as a magnetic write head and positioning it adjacent the track. At least a first and a second magnetic domain are induced within the track with the write head according to a perpendicular magnetic recording scheme. A domain wall is defined between the first and second magnetic domains. After creating the magnetic domains and the domain wall, the domain wall migrates to one of the plurality of pinning sites in the track. According to one embodiment, a read head is positioned adjacent the pinning site and used to detect the presence or absence of a domain wall.

The tracks 46 and grooves 48 can be formed in the magnetic recording layer with any suitable patterning process. In one embodiment, the manufacturing process involves a nanoimprint process in which a template (produced from an electron-beam, or e-beam, master) imprints the desired pattern in a resist layer on the disk. The pattern is then transferred to the magnetic recording layer through an additive or subtractive transfer process and a planarization process polishes the remaining material.

Figure 10A:
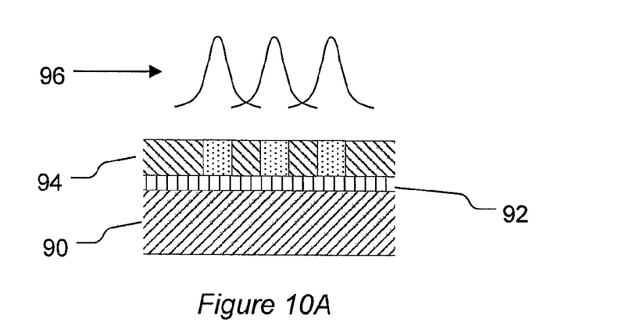
FIGS. 10A-10E illustrate a process of patterning a master disk for nanoimprinting according to one aspect of the present invention.
Figure 10B:
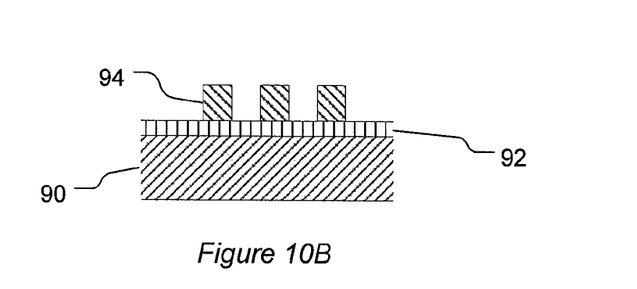

The nanoimprint master can be patterned with, among other processes, electron beam lithography (EBL). Referring to FIGS. 10A-10E, a process using a negative resist patterned by EBL is illustrated according to one embodiment of the invention. As will be appreciated, a substrate 90 can be coated with a thin hard mask film 92 which in turn is coated with a resist layer 94. The electron beam exposes the resist layer 94 according to an energy distribution pattern 96 corresponding to the desired track and groove formation. Referring to FIG. 10B, after exposure, those areas of the resist layer 94 not exposed to a sufficient level of energy can be developed away, leaving the distribution pattern 96 formed in the resist layer 94.

Figure 10C:
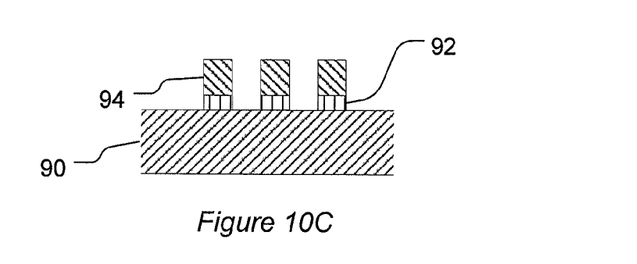
Figure 10D:
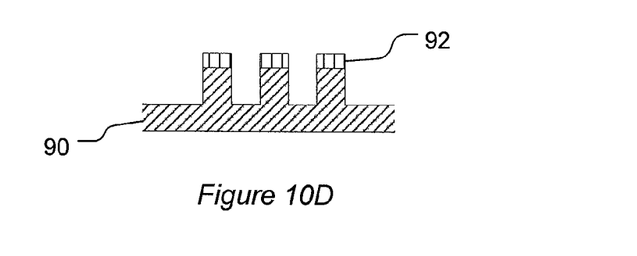
Figure 10E:
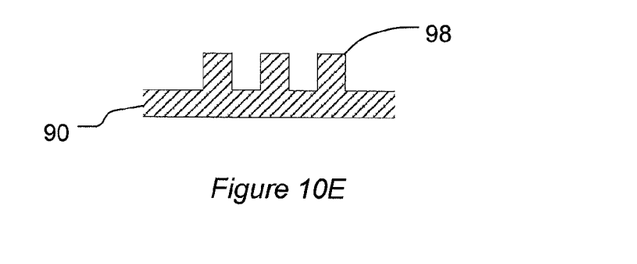

Referring to FIG. 10C, after development, those areas of the hard mask film 92 not covered by the resist layer 94 can be etched away to expose the underlying substrate 90, using, for example, ion beam etching or reactive ion etching. According to some embodiments, the remaining resist material can then be stripped prior to performing another etch to remove corresponding portions of the substrate 90 as shown in FIGS. 10D and 10E. As shown in FIG. 10E in cross-section, the final etch patterns to substrate 90 to include ridges 98, which correspond to the desired groove pattern. The master can then be used to stamp magnetic recording disks with the desired pattern, or it can be used to create a number of templates for stamping.

Although a process using a negative resist is shown in FIGS. 10A-10E, it will be appreciated that a suitable positive resist can also be used. According to some embodiments, the substrate 90 can comprise silicon or fused silica, which can facilitate a photo curing nanoimprint process for creating the templates and/or magnetic recording disks. The material for the hard mask film 94 can comprise chromium or another suitable material.

Figure 11A:
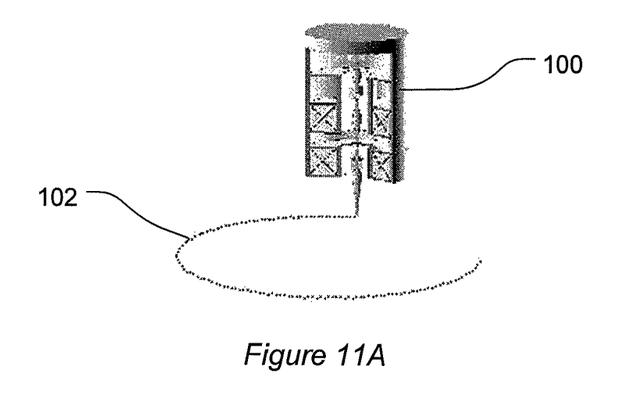
FIGS. 11A-11C illustrate a process of patterning a master disk with a rotational stage electron beam source according to one aspect of the present invention.
Figure 11B:
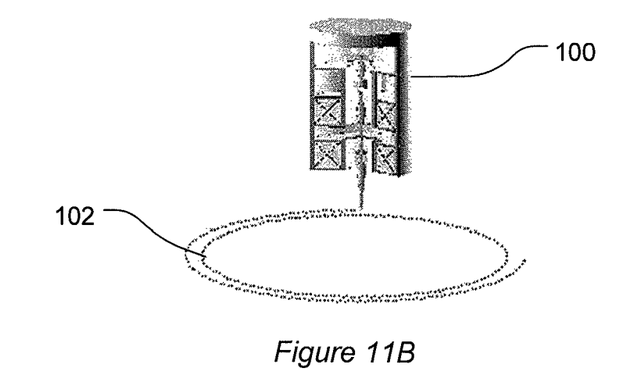
Figure 11C:
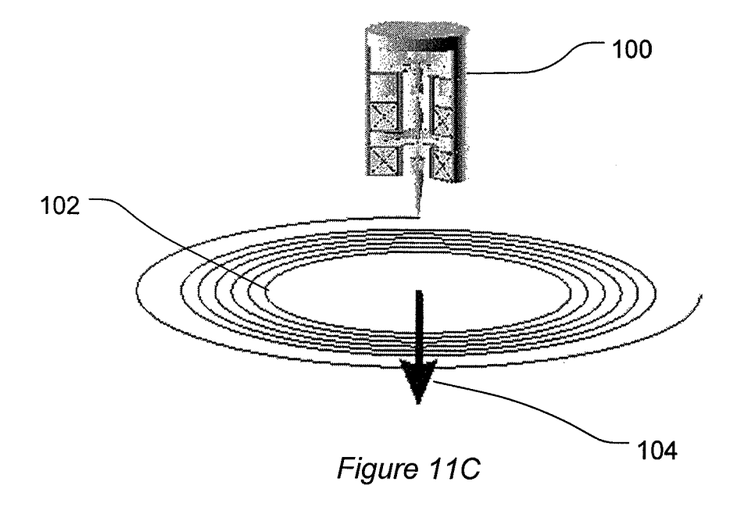

FIGS. 11A-11C illustrate one possible embodiment in which the resist layer 94 can be patterned track-by-track via a rotating e-beam source 100. According to this embodiment, the master substrate 90 can be supported by a stage for both rotational movement and linear translation in at least one radial direction with respect to the e-beam source 100. Referring to FIG. 11A, the e-beam can focus on a single point, starting at the inner diameter of the master disk. As the stage rotates, the energy of the e-beam is modulated to produce a corresponding groove 102 around the master disk. Upon completing the groove 102, the e-beam is deflected by one track-pitch and the process is repeated as shown in FIG. 11B. Referring to FIG. 11C, after the e-beam has been deflected to the full extent possible, the stage can translate in the radial direction 104 and the entire process repeats until the resist layer is fully patterned.

According to some embodiments, the stage may rotate at a rate between about 10 and 3000 rotations per minute (RPM), either clockwise or counterclockwise as the e-beam exposes the resist layer. The stage may move at a constant linear or constant angular velocity, depending upon the particular application. A laser interferometer can track the linear movement of the stage, while optical encoders placed in the stage spindle can track rotational movement. In some embodiments the EBL system may have an open loop configuration in which rotation control is fed to the stage, while in other embodiments, the system may use signals from the optical encoders to provide closed loop feedback.

Figure 12:
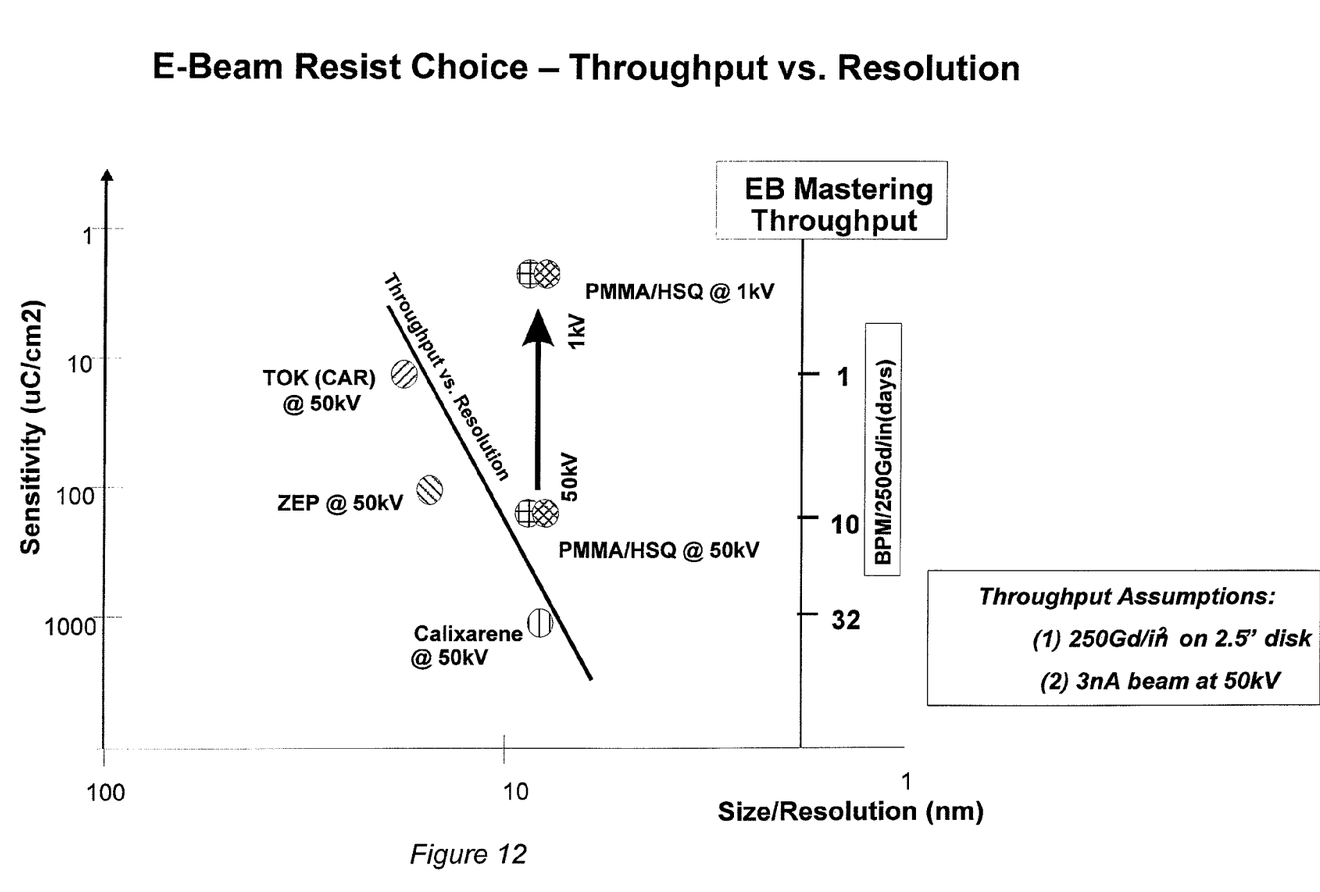
FIG. 12 is a chart illustrating a relationship between throughput and resolution for resist materials according to one aspect of the present invention.

A number of possible resist materials are possible, with the selection depending, at least in part, upon the desired resolution (e.g., track pitch) and mastering throughput. FIG. 12 and Table 1 illustrate a number of possible resist materials, along with estimated resolutions and mastering times. As is shown, possible resist materials that may be used include, but are not limited to, chemically amplified resists (CAR), ZEP, polymethyl methacrylate (PMMA), hydrogen silsesquioxane (HSQ), or Calixarene. The estimated properties in Table 1 and FIG. 12 correspond to a master disk with a 2.5 inch diameter, an inside diameter of 13 mm and an outside diameter of 31 mm, having 354,000 tracks at a 50 nm track-pitch. As seen from FIG. 12, an increase in throughput generally corresponds to a loss in resolution.

TABLE 1

Mastering time estimation

| Resist | Dose (uC/cm$^2$) | Current (nA) | Velocity (mm/s) | RPM Start | RPM End | Write Time (Days) | Resolution (nm) |
|---|---|---|---|---|---|---|---|
| CAR | 60.0 | 3.0 | 200.0 | 40.5 | 94.5 | 3.6 | 30 |
| ZEP | 300.0 | 3.0 | 40.0 | 8.1 | 45.3 | 9.2 | 15 |
| PMMA | 500.0 | 3.0 | 24.0 | 4.9 | 27.2 | 15.3 | 10 |
| HSQ | 500.0 | 3.0 | 24.0 | 4.9 | 27.2 | 15.3 | 10 |
| Calixarene | 1000.0 | 3.0 | 12.0 | 2.4 | 13.6 | 30.7 | 5 |

Figure 13:
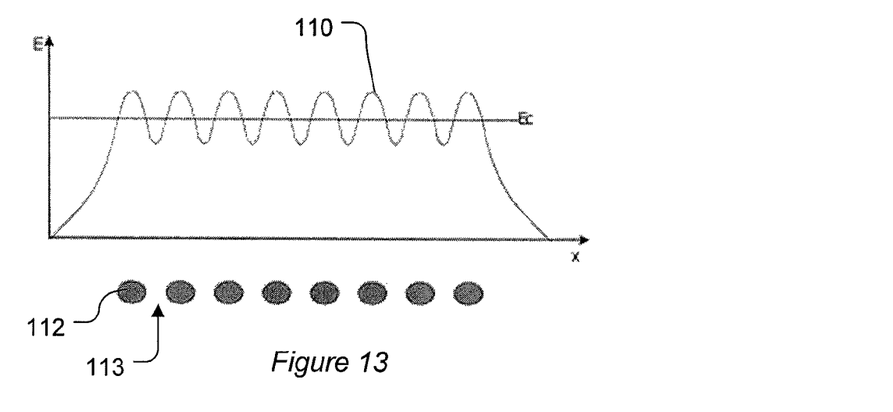
FIG. 13 illustrates a schematic representation of exposure levels and a corresponding pattern for the magnetic recording layer according to one aspect of the present invention.
Figure 14:
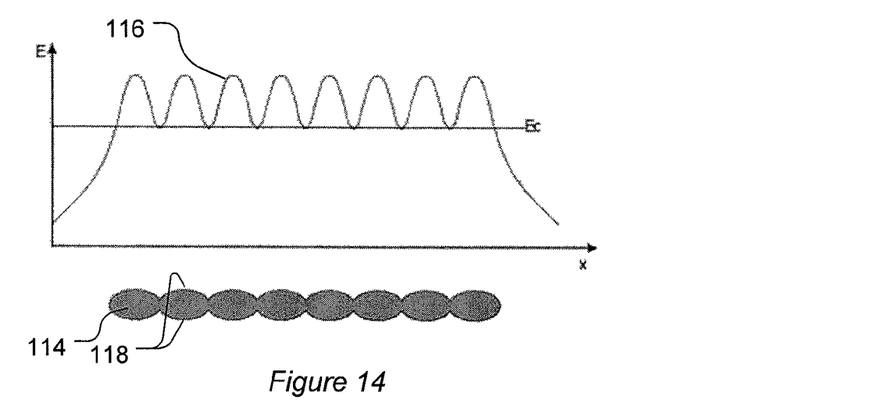
FIG. 14 illustrates a schematic representation of exposure levels and a corresponding pattern for the magnetic recording layer according to one aspect of the present invention.
Figure 15:
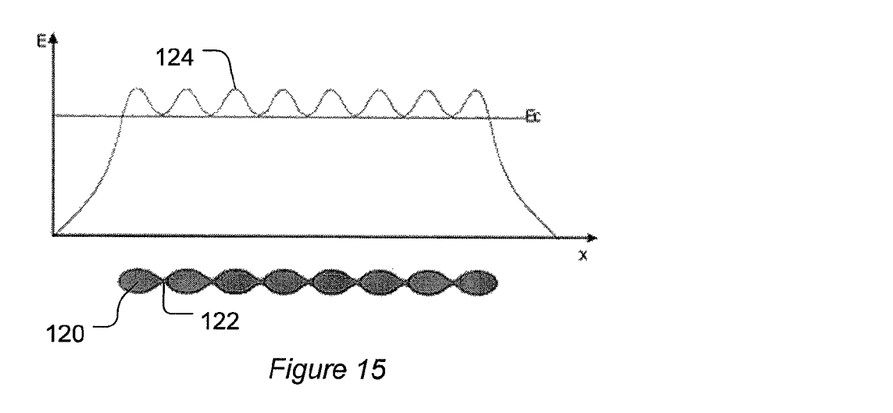
FIG. 15 illustrates a schematic representation of exposure levels and a corresponding pattern for the magnetic recording layer according to one aspect of the present invention.

FIGS. 13-15 are schematic representations of exposure levels from an electron beam and the corresponding patterns resulting in a resist layer on the master disk substrate (and ultimately, through imprinting, in one or more magnetic disks). As previously discussed, each groove can comprise a series of holes. Referring to FIG. 13, the depicted plot represents an electron energy distribution 110 corresponding to the exposure of a series of discrete dots 112 in the resist layer on, e.g., a master disk substrate. Proximity effects from electron scattering result in electron exposure in between dots, thus producing the distribution 110. Exposed areas having electron energy exceeding a threshold energy level $E_c$ will develop away, thus forming a groove comprising isolated dots 112 and discontinuities 113 in the resist. The dots can be developed away with, for example, a standard developer and the exposed areas are etched to provide the corresponding holes in the substrate of the stamper.

To provide more of a continuous groove, in some embodiments adjacent dots are merged by deliberately degrading the imaging contrast. For example, the pattern may be over-exposed and/or over-developed to merge adjacent dots. Referring to FIG. 14, dots 114 are merged through over-exposure or over-development. Varying the exposure dose effectively raises or lowers the $E_c$ level thus resulting in different size holes. A second electron energy distribution 116 illustrates that the exposure level has been increased so that the dots 114 merge. Upon etching the corresponding portions of the substrate away, a continuous groove is formed in the stamper substrate. As will be appreciated, to form a track, at least two grooves are formed in this manner. The sides 118 of each original dot 114 provide the indentations in the track's sidewalls and corresponding pinning sites as previously described.

Referring to FIG. 15, in some embodiments, dots 120 can be merged to form a continuous groove by partially exposing a connecting portion 122 between adjacent dots 120 similar to the embodiments depicted in FIGS. 8 and 9. A third waveform 124 illustrates the energy of the electron beam increased slightly above the energy threshold $E_c$ in between dots 120. This method of forming the grooves can provide more control over the size and shape of the grooves, and thus the defined tracks. Although the dot patterns in FIGS. 13-15 appear straight, it will be appreciated that in some embodiments, such as those including a magnetic recording disk, the dot patterns, i.e., grooves, actually extend circumferentially around the master disk's center.

Once the e-beam master has been formed, a nanoimprint process can be used to transfer the pattern to a number of magnetic recording disks. In a preferred embodiment, the master disk is used to create multiple templates which are subsequently used to imprint magnetic recording disks. According to one embodiment, a photo curing process can be used to imprint a pattern from the master disk into a template, although other nanoimprinting processes, such as thermoplastic patterning, may also be used. The template is then used to pattern multiple magnetic recording disks.

Referring to FIGS. 16A-16E, one possible nanoimprinting process with a UV (ultraviolet) cure step is illustrated according to one embodiment of the invention. For example, in one embodiment the patterning process may comprise step and flash imprint lithography (S-FIL). As depicted, the soft underlayer 42 and magnetic recording layer 44 are deposited over the substrate 40 of a magnetic recording disk. A hard transfer layer 130, such as a metallic film, can be deposited over the magnetic recording layer 44. An etch barrier 132 is deposited on top of the transfer layer 130, and a template 134 with the desired pattern of tracks and grooves is provided for imprinting the etch barrier 132. While a subtractive pattern transfer is illustrated, some embodiments may alternatively include deposition processes where the resist is deposited and patterned, and the patterned magnetic material is then formed through, for example, electrodeposition.

Figure 16A:
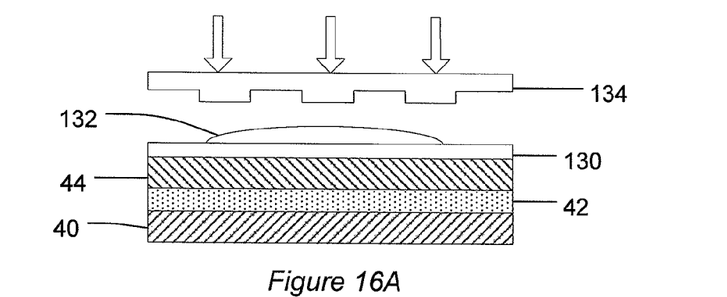
FIGS. 16A-16E illustrate a photo nanoimprint lithography process according to one aspect of the present invention.
Figure 16B:
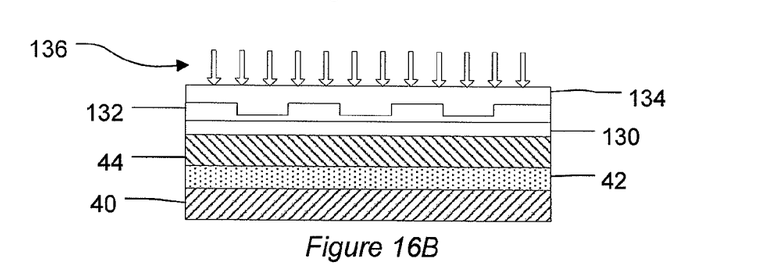
Figure 16C:
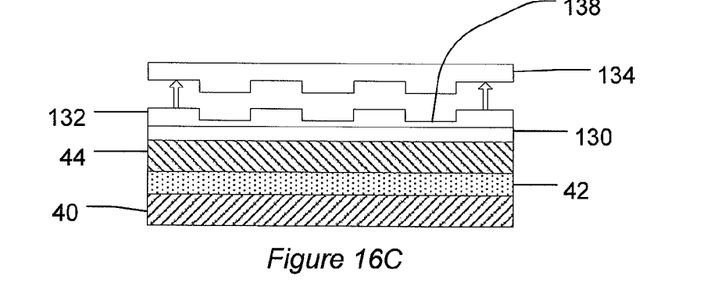
Figure 16D:
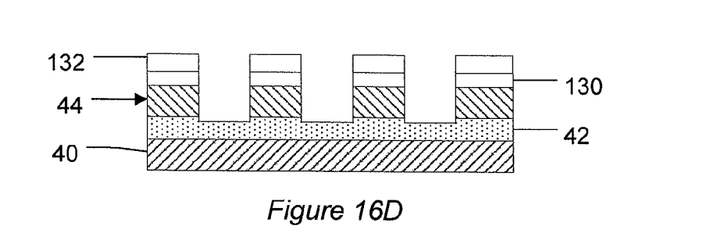
Figure 16E:
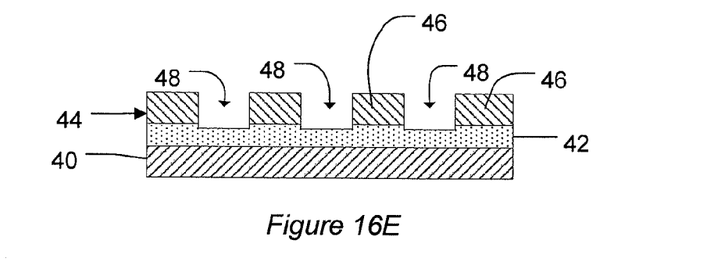

Referring to FIG. 16B, as the template is pressed into the etch barrier 132, the etch barrier spreads across the surface to fill in the relief areas in the template 134. The etch barrier 132 can comprise a low viscosity monomer film, such as an acrylate or vinyl ether. The template 134 can be formed from a transparent, fused silica, which allows UV radiation 136 through the template to photopolymerize the etch barrier 132. Upon removing the template 134 in FIG. 16C, an inverse relief of the template 134 is formed in the etch barrier 132. A first etch, such as, for example, ion beam etching or reactive ion etching, can remove residual portions 138 of the etch barrier 132, while a second, more selective etch can remove portions of the transfer layer 130, magnetic recording layer 44 and soft underlayer 42 according to one embodiment as shown in FIG. 16D. As shown in FIG. 16E, after patterning the magnetic layer, the remaining resist can be removed and a suitable planarization method (e.g., chemical mechanical polish, grazing incidence ion etching, etc.) can polish the remaining surface of the magnetic recording layer 44.

Thus, embodiments of the present invention are disclosed. Although the present invention has been described in considerable detail with reference to certain disclosed embodiments, the disclosed embodiments are presented for purposes of illustration and not limitation. The implementations described above and other implementations are within the scope of the following claims.

What is claimed is:

1. A magnetic recording medium, comprising:
   a substrate;
   a soft magnetic underlayer overlying the substrate;
   a magnetic recording layer overlying the soft magnetic underlayer, the magnetic recording layer comprising at least two grooves providing a track, wherein the track comprises first and second sidewalls formed by the at least two grooves, wherein the first and second sidewalls provide a plurality of pinning sites formed between the first and second sidewalls for pinning magnetic domain walls in the track; and
   wherein at least one of the plurality of pinning sites comprises a first indentation in the first sidewall and a paired second indentation in the second sidewall.

2. The magnetic recording medium of claim 1, wherein the at least one of the plurality of pinning sites comprises a local track width minimum with respect to adjacent portions of the first and second sidewalls.

3. The magnetic recording medium of claim 1, wherein the magnetic recording medium comprises a magnetic recording disk having a center and the at least two grooves and the track extend circumferentially around the center of the magnetic recording disk.

4. The magnetic recording medium of claim 3, wherein the plurality of pinning sites are radially aligned with respect to the center of the magnetic recording disk.

5. The magnetic recording medium of claim 1, wherein the at least two grooves comprise discontinuities.

6. The magnetic recording medium of claim 1, wherein the plurality of pinning sites are positioned at predetermined intervals along the track.

7. The magnetic recording medium of claim 6, wherein the track further comprises bit cells and wherein each bit cell comprises at least one pinning site.

8. The magnetic recording medium of claim 7, wherein consecutive bit cells of the track respectively comprise consecutive pinning sites in the track.

9. The magnetic recording medium of claim 1, wherein the at least two grooves extend through the magnetic recording layer into the soft magnetic underlayer.

10. The magnetic recording medium of claim 9, further comprising a non-magnetic filler in the at least two grooves.

11. The magnetic recording medium of claim 1, wherein the magnetic recording layer comprises FePt and is adapted for perpendicular magnetic recording.

12. A magnetic storage device, comprising:
   a base;
   a magnetic recording medium mounted to the base, comprising a substrate, a soft magnetic underlayer overlying the substrate, and a magnetic recording layer overlying the soft magnetic underlayer, the magnetic recording layer comprising at least two grooves providing a track, wherein the track comprises first and second sidewalls formed by the at least two grooves, wherein the first and second sidewalls provide a plurality of pinning sites formed between the sidewalls for pinning magnetic domain walls in the track, wherein at least one of the plurality of pinning sites comprises a first indentation in the first sidewall and a corresponding second indentation in the second sidewall;
   a transducer positioned adjacent to the magnetic recording medium; and
   an actuator coupled to the transducer for moving the transducer relative to the magnetic recording medium.

13. The magnetic storage device of claim 12, wherein the at least one of the plurality of pinning sites comprises a local track width minimum with respect to adjacent portions of the first and second sidewalls.

14. The magnetic storage device of claim 12, wherein the magnetic recording medium comprises a magnetic recording disk having a center and wherein the pinning sites are radially aligned with respect to the center of the magnetic recording disk.

15. The magnetic storage device of claim 12, wherein the plurality of pinning sites are positioned at predetermined intervals along the track.

16. The magnetic storage device of claim 15, wherein the track further comprises bit cells and wherein each bit cell comprises at least one pinning site.

17. The magnetic storage device of claim 15, wherein consecutive bit cells of the track respectively comprise consecutive pinning sites in the track.

18. The magnetic storage device of claim 12 further comprising a non-magnetic filler in the at least two grooves.

19. A method of storing data in a magnetic storage medium, comprising:

provinding a magnetic storage device comprising the magnetic storage medium and a write head, wherein the magnetic storage medium comprises a soft magnetic underlayer and a magnetic recording layer overlying the soft magnetic underlayer, the magnetic recording layer comprising at least two grooves providing a track, the track comprising a plurality of pinning sites for pinning magnetic domain walls;

positioning the write head adjacent the track;

inducing first and second magnetic domains within the track with the write head, wherein the first and second magnetic domains define a first domain wall; and wherein the first domain wall migrates to one of the plurality of pinning sites in the track.

20. The method of claim 19, wherein the magnetic storage device further comprises a read head, and further comprising positioning the read head adjacent one of the plurality of pinning sites and detecting a presence or an absence of a second domain wall.

* * * * *